(12) United States Patent
Wulf et al.

(10) Patent No.: US 8,768,587 B2
(45) Date of Patent: Jul. 1, 2014

(54) WORKSITE MANAGEMENT SYSTEM WITH GEAR RECOMMENDATION

(75) Inventors: Stefan J. Wulf, Washington, IL (US); Christopher M. Sprock, Peoria, IL (US); Mahmoud M. Tobaa, Dunlap, IL (US); Mallikharjuna Rao Boddu, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 146 days.

(21) Appl. No.: 13/557,628

(22) Filed: Jul. 25, 2012

(65) Prior Publication Data
US 2014/0032061 A1  Jan. 30, 2014

(51) Int. Cl.
| | |
|---|---|
| *G06F 7/00* | (2006.01) |
| *E02F 9/20* | (2006.01) |
| *E02F 9/26* | (2006.01) |
| *G06Q 10/06* | (2012.01) |
| *G06Q 50/08* | (2012.01) |
| *G05B 13/04* | (2006.01) |
| *G07C 5/00* | (2006.01) |
| *G09B 19/16* | (2006.01) |
| *G07C 5/08* | (2006.01) |

(52) U.S. Cl.
CPC ............ *E02F 9/2025* (2013.01); *E02F 9/2079* (2013.01); *E02F 9/202* (2013.01); *E02F 9/262* (2013.01); *G06Q 10/0637* (2013.01); *G06Q 10/0639* (2013.01); *G06Q 50/08* (2013.01); *G05B 13/048* (2013.01); *G07C 5/008* (2013.01); *G09B 19/167* (2013.01); *G07C 5/085* (2013.01)
USPC ................... 701/64; 701/50; 701/53; 701/58; 701/65

(58) Field of Classification Search
CPC ....... E02F 9/2025; E02F 9/2079; E02F 9/202; E02F 9/262; G06Q 10/0637; G06Q 10/0639; G06Q 50/08; B60W 20/30; G02D 2201/021; G05B 13/048; G07C 5/008; G07C 5/085; G09B 19/167; B60T 8/171; B60T 8/172; B60T 8/24
USPC .................. 701/50, 51, 53, 54, 58, 62, 64, 65
See application file for complete search history.

(56) References Cited

U.S. PATENT DOCUMENTS

| | | | | |
|---|---|---|---|---|
| 4,967,385 | A | * | 10/1990 | Brekkestran et al. .......... 702/105 |
| 5,629,849 | A | * | 5/1997 | Ahn ................................ 701/50 |
| 5,911,771 | A | | 6/1999 | Reichart et al. |
| 5,931,886 | A | | 8/1999 | Moroto et al. |
| 6,070,118 | A | | 5/2000 | Ohta et al. |
| 7,113,105 | B2 | * | 9/2006 | Sahm et al. .................... 340/679 |
| 7,460,941 | B2 | * | 12/2008 | Sychra et al. .................... 701/50 |
| 7,810,626 | B2 | * | 10/2010 | Schiele et al. ............. 192/219.4 |

(Continued)

*Primary Examiner* — Russell Frejd
(74) *Attorney, Agent, or Firm* — Finnegan, Henderson, Farabow, Garrett & Dunner LLP

(57) ABSTRACT

A method of operating a machine at a worksite includes determining data associated with at least one of a machine operation at the worksite and a worksite condition, and determining, based on the data, that one of machine propulsion and machine retarding will be required for greater than a corresponding threshold. The method also includes determining, in response to determining that machine propulsion will be required, a desired propulsion gear, and recommending the propulsion gear to an operator of the machine. The method further includes determining, in response to determining that machine retarding will be required, a desired retarding gear, and recommending the retarding gear to the operator. In such a method, the retarding gear is determined based on a maximum temperature associated with the machine.

20 Claims, 4 Drawing Sheets

(56) References Cited

U.S. PATENT DOCUMENTS

| | | |
|---|---|---|
| 7,818,140 B2 | 10/2010 | Dreier et al. |
| 8,538,645 B2 * | 9/2013 | Anderson et al. ............... 701/54 |
| 2007/0007099 A1 * | 1/2007 | Gierling et al. ............ 192/219.1 |
| 2008/0249693 A1 | 10/2008 | Kresse |
| 2009/0188224 A1 * | 7/2009 | Assie et al. ......................... 56/7 |
| 2009/0198422 A1 | 8/2009 | Vik et al. |
| 2010/0198466 A1 * | 8/2010 | Eklund et al. ................... 701/50 |

* cited by examiner

WORKSITE MANAGEMENT SYSTEM WITH GEAR RECOMMENDATION

TECHNICAL FIELD

The present disclosure is directed to a worksite management system and, more particularly, to a worksite management system configured to recommend a gear to a machine operator.

BACKGROUND

Mining, construction, and other large scale excavating operations require fleets of digging, loading, and hauling machines to remove and transport excavated material such as ore and overburden from an area of excavation to a processing location. For such an operation to be profitable, the fleet of machines must be productively and efficiently operated. Many factors can influence productivity and efficiency at a worksite including, among other things, worksite conditions (e.g., rain, snow, ground moisture levels, material composition, visibility, terrain contour, haul route conditions, haul route traffic, etc.) and machine operating conditions (e.g., age, state of disrepair, malfunction, fuel grade in use, payload, tire pressure, rolling resistance, transmission shift points, fuel limits, steering limits, machine travel speed, brake coolant temperature, transmission gear used for machine retarding/propulsion, etc.). Productivity and efficiency at a worksite is also affected by the machine operators themselves. For example, once an operator has become accustomed to operating the machine in a particular gear at locations along the haul route, the operator may avoid selecting alternate gears at such locations even though such alternate gears may result in more efficient machine operation in some situations. Such "gear limiting" by the operator may reduce the machine operating efficiency, and thus, the overall productivity of the worksite.

One attempt to improve worksite productivity and efficiency is disclosed in U.S. Patent Publication No. 2009/0198422 (the '422 publication) by Vik et al. published on Aug. 6, 2009. In the '422 publication, Vik et al. discloses a worksite management system having a plurality of machines, a plurality of data acquisition modules configured to monitor performance of each of the machines, and a controller in communication with the data acquisition modules. The controller is configured to collect machine performance data from the data acquisition modules, and detect a performance irregularity based on the collected machine performance data. The controller is further configured to analyze the collected machine performance data, and determine which of a machine condition, an operator condition, and a site condition is the predominant cause of the performance irregularity based on the comparison.

Although the system of the '422 publication may attempt to improve worksite productivity and efficiency by identifying a cause of a performance irregularity, the system of the '422 publication does little to assist the operator in operating the disclosed machines more efficiently. For instance, the system of the '422 publication is not configured to assist the operator in selecting a gear base on machine operation and worksite condition data. As a result, due to gear limiting, operators of the machines disclosed in the '422 publication may still operate the machines utilizing a suboptimal gear.

The present disclosure is directed to overcoming one or more of the problems set forth above and/or other problems of the prior art.

SUMMARY

In an exemplary embodiment of the present disclosure, a method of operating a machine at a worksite includes determining data associated with at least one of a machine operation at the worksite and a worksite condition, and determining, based on the data, that one of machine propulsion and machine retarding will be required for greater than a corresponding threshold. The method also includes determining, in response to determining that machine propulsion will be required, a desired propulsion gear, and recommending the propulsion gear to an operator of the machine. The method further includes determining, in response to determining that machine retarding will be required, a desired retarding gear, and recommending the retarding gear to the operator. In such a method, the retarding gear is determined based on a maximum temperature associated with the machine.

In another exemplary embodiment of the present disclosure, a method of operating a machine at a worksite includes determining data associated with a machine operation at the worksite and a worksite condition, and providing the data to a remote worksite controller in communication with the machine. The method also includes determining, based on the data, that one of machine propulsion and machine retarding will be required for greater than a corresponding threshold, and sending, in response to determining that machine propulsion will be required, a propulsion signal from the worksite controller to the machine. In such a method, the propulsion signal indicates a desired propulsion gear associated with a haul route of the worksite on which the machine is located. Such a method also includes recommending the propulsion gear to an operator of the machine in response to the propulsion signal. Such an exemplary method further includes sending, in response to determining that machine retarding will be required, a retarding signal from the worksite controller to the machine. In such a method, the retarding signal indicates a desired retarding gear associated with the haul route. Such a method also includes recommending the retarding gear to the operator in response to the retarding signal, and the retarding gear is determined based on a maximum brake coolant temperature associated with the machine.

In a further exemplary embodiment of the present disclosure, a system for use with a machine at a worksite includes at least one sensor disposed on the machine. The at least one sensor is configured to determine data associated with at least one of a machine operation at the worksite and a worksite condition. The system also includes a control module disposed on the machine, and the control module is in communication with the at least one sensor and is configured to control operations of the machine. The system further includes a worksite controller disposed remote from the machine and in communication with the control module. The worksite controller is configured to determine, based on the data, that one of machine propulsion and machine retarding will be required for greater than a corresponding threshold. The worksite controller is also configured to send, in response to determining that machine propulsion will be required, a propulsion signal to the control module, the propulsion signal indicating a desired propulsion gear associated with a haul route of the worksite on which the machine is located. In such an embodiment, the control module is configured to recommend the propulsion gear to an operator of the machine in response to the propulsion signal. The worksite controller is also configured to send, in response to determining that machine retarding will be required, a retarding signal to the control module, the retarding signal indicating a desired retarding gear associated with the haul route. In such an embodiment, the control module is configured to recommend the retarding gear to the operator in response to the retarding signal. Additionally, the retarding gear is determined based on a maximum temperature associated with the machine.

DETAILED DESCRIPTION

Figure 1:
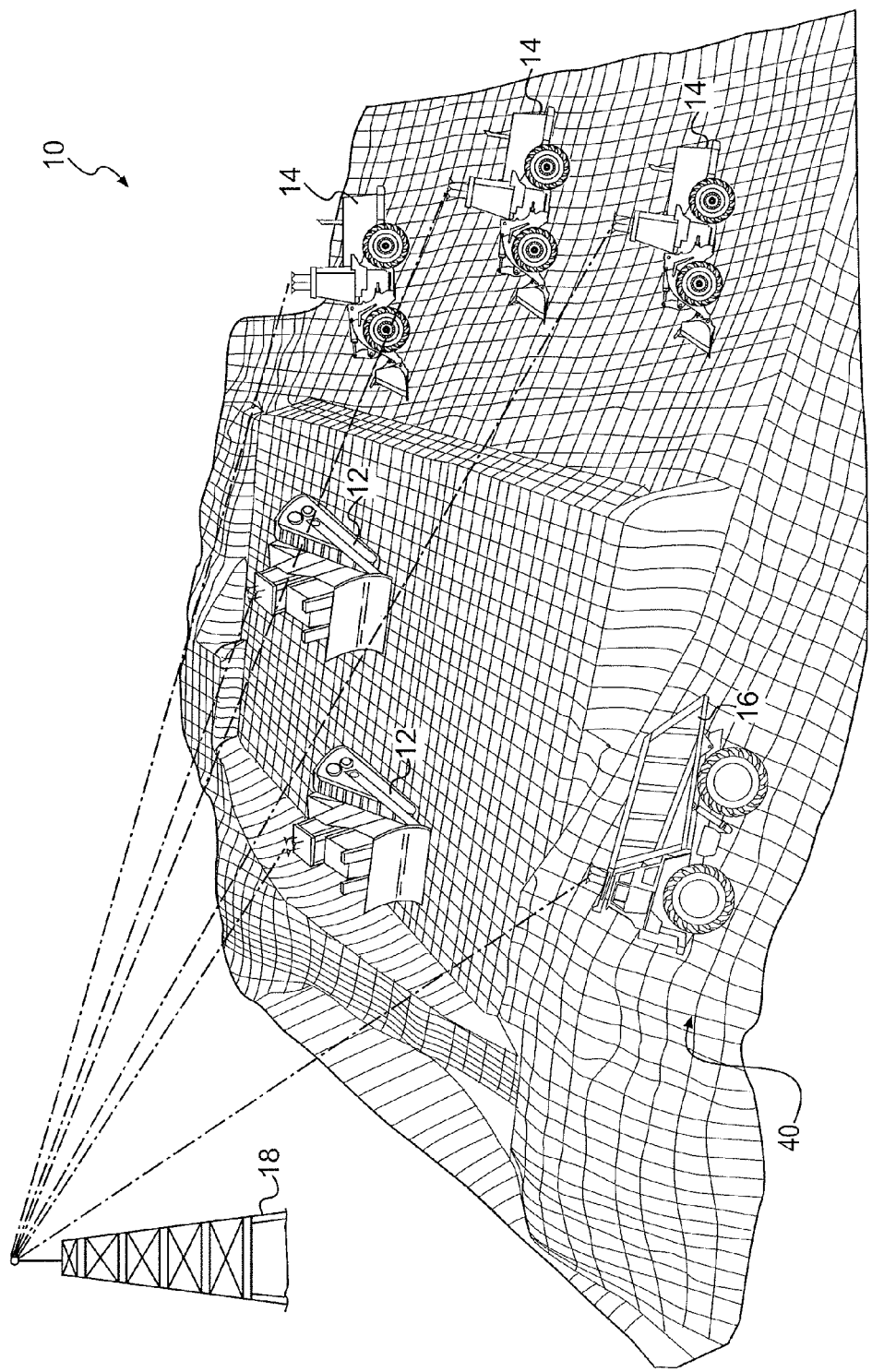
FIG. 1 is a schematic and diagrammatic representation of an exemplary disclosed worksite.

FIG. 1 shows a worksite 10 such as, for example, an open pit mining operation. As part of the mining function, various machines may operate at or between different locations of the worksite 10. These machines may include, digging machines 12, loading machines 14, and hauling machines 16, transport machines (not shown), and other types of machines known in the art. Each of the machines at worksite 10 may be in communication with each other and with a central station 18 by way of wireless communication to remotely transmit and receive operational data and instructions.

A digging machine 12 may refer to any machine that reduces material at worksite 10 for the purpose of subsequent operations (i.e. for blasting, loading, and hauling operations). Examples of digging machines 12 may include excavators, backhoes, dozers, drilling machines, trenchers, drag lines, etc. Multiple digging machines 12 may be co-located within a common area at worksite 10 and may perform similar functions. As such, under normal conditions, similar co-located digging machines 12 should perform about the same with respect to productivity and efficiency when exposed to similar site conditions.

A loading machine 14 may refer to any machine that lifts, carries, and/or loads material that has been reduced by digging machine 12 onto waiting hauling machines 16. Examples of a loading machine 14 may include a wheeled or tracked loader, a front shovel, an excavator, a cable shovel, a stack reclaimer, or any other similar machine. One or more loading machines 14 may operate within common areas of worksite 10 to load reduced materials onto hauling machines 16. Under normal conditions, similar co-located loading machines 14 should perform about the same with respect to productivity and efficiency when exposed to similar site conditions.

A hauling machine 16 may refer to any machine that carries the excavated materials between different locations within worksite 10. Examples of hauling machine 16 may include an articulated truck, an off-highway truck, an on-highway dump truck, a wheel tractor scraper, or any other similar machine. Loaded hauling machines 16 may carry excavated, mined, and/or otherwise removed worksite material from areas of excavation within worksite 10, along roads, paths, and/or other like haul routes 40 of the worksite 10 to various dump sites, and return to the same or different excavation areas to be loaded again. Under normal conditions, similar co-located hauling machines 16 should perform about the same with respect to productivity and efficiency when exposed to similar site conditions.

Figure 2:
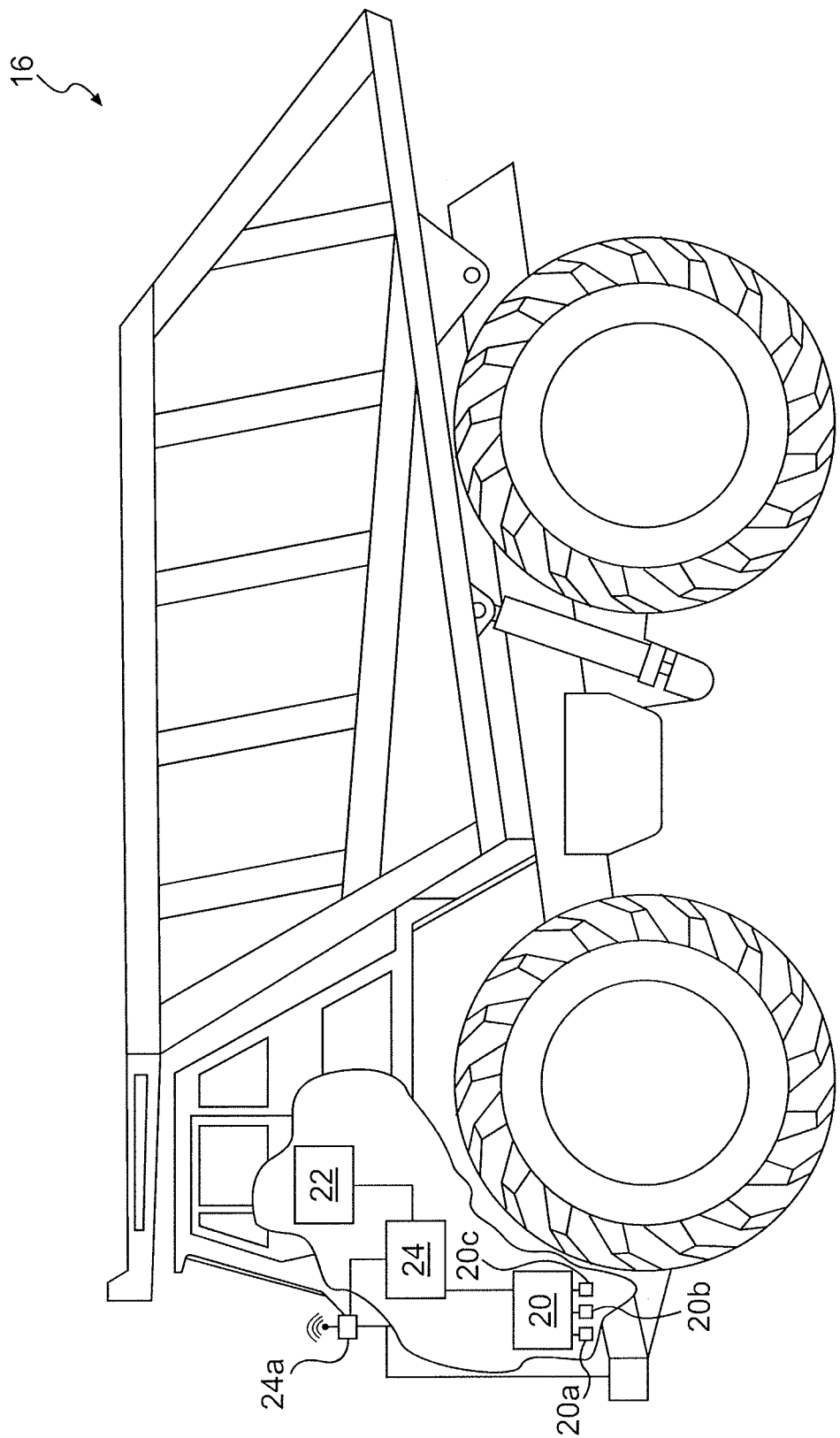
FIG. 2 is a diagrammatic illustration of an exemplary disclosed machine that may operate at the worksite of FIG. 1.

FIG. 2 shows an exemplary machine that may be operated at worksite 10. It should be noted that, although the depicted machine may embody a hauling machine 16, the following description may be equally applied to any machine operating at worksite 10. Hauling machine 16 may record and transmit data to central station 18 (referring to FIG. 1) during its operation. Similarly, central station 18 may analyze the data and transmit information to hauling machines 16. The data transmitted to central station 18 may include machine identification data, machine performance data, worksite data, diagnostic data, and other data, which may be automatically monitored from onboard machine 16 and/or manually observed and input by machine operators. The information remotely transmitted back to hauling machines 16 may include electronic terrain maps, machine configuration commands, instructions, signals, and/or recommendations.

Identification data my include machine-specific data, operator-specific data, and/or location-specific data. Machine-specific data may include identification data associated with a type of machine (e.g., digging, loading, hauling, etc.), a make and model of machine (e.g., Caterpillar 797 OHT), a machine manufacture date or age, a usage or maintenance/repair history, etc. Operator-specific data may include an identification of a current operator, information about the current operator (e.g., a skill or experience level, an authorization level, an amount of time logged during a current shift, a usage history, etc.), a history of past operators, etc. Site-specific data may include a task currently being performed by the operator, a current location at worksite 10, a location history, a material composition at a particular area of worksite 10, current grade of the haul route, upcoming grade of the haul route, traffic on the haul route, haul route terrain/conditions, site-imposed speed limits, etc.

Machine performance data may include current and historic data associated with operation of a machine at worksite 10. Machine performance data may include, for example, payload information (e.g., weight, strut pressure, and/or other like metrics useful in determining the amount of payload carried by the machine), efficiency information, productivity information, fuel economy information, speed information, traffic information, weather information, road and/or surface condition information, maneuvering information (e.g., braking events, steering, wheel slip, etc.), downtime and repair or maintenance information, etc.

Diagnostic data may include recorded parameter information associated with specific components and/or systems of the machine. For example, diagnostic data could include engine temperatures, engine pressures, engine and/or machine travel speeds and acceleration, fluid characteristics (e.g., levels, contamination, viscosity, temperature, pressure etc.), fuel consumption, engine emissions, brake conditions (e.g., brake temperatures, brake coolant temperatures, and/or other temperatures associated with machine brakes), transmission characteristics (e.g., shifting, current gear, torques, and speed), lock-up clutch status (e.g., engaged or disengaged), air and/or exhaust pressures and temperatures, engine calibrations (e.g., injection and/or ignition timings), throttle pedal position, wheel torque, rim power, tire temperature, tire pressure, rolling resistance, system voltage, etc. Some diagnostic data may be monitored directly, while other data may be derived or calculated from the monitored parameters. Diagnostic data may be used to determine performance data, if desired.

To facilitate the collection, recording, and transmitting of data from the machines at worksite 10 to central station 18 (referring to FIG. 1) and vice versa, each hauling machine 16 may include an onboard control module 20, an operator interface module 22, and a communication module 24. Data received by control and operator interface modules 20, 22 may be sent offboard to central station 18 by way of communication module 24. Communication module 24 may also be used to send instructions and/or recommendations from central station 18 and/or control module 20 to an operator of hauling machine 16 by way of operator interface module 22. It is contemplated that additional or different modules may be included onboard hauling machine 16, if desired.

Control module 20 may include a plurality of sensors 20a, 20b, 20c distributed throughout hauling machine 16 and configured to gather data from various components and subsystems thereof. It is contemplated that a greater or lesser number of sensors may be included than that shown in FIG. 2. Sensors 20a, 20b, 20c may be associated with a power source (not shown), a transmission (not shown), a traction device, machine brakes, a machine brake coolant circuit, a work implement, an operator station, and/or other components and subsystems of hauling machine 16. These sensors 20a, 20b, 20c may be configured to provide data gathered from each of the associated components and subsystems. For example, one of more of the sensors 20a, 20b, 20c may comprise a thermometer, a thermocouple, and/or other like temperature sensor configured to determine a brake coolant temperature. Such a temperature sensor may be thermally coupled to and/or otherwise associated with one or more fluid lines (not shown) and/or other like brake coolant circuit components. Such a temperature sensor may be configured to determine a temperature of brake coolant provided to the machine brakes via the brake coolant circuit.

Other pieces of information may be generated or maintained by control module 20 such as, for example, time of day, date, weather, road or surface conditions, and machine location (global and/or local). Control module 20 may also be in direct communication with the separate components and subsystems of machine 16 to facilitate manual, autonomous, and/or remote control of machine 16. For example, control module 20 may be in communication with the power source of machine 16 to control fueling, the transmission to control shifting, a steering mechanism to control heading, a differential lock to control traction, a braking mechanism to control deceleration, a tool actuator to control material dumping, and with other components and/or subsystems of machine 16. Based on direct commands from a human operator, remote commands from central station 18, and/or self-direction, control module 20 may selectively adjust operation of the components and subsystems of machine 16 to accomplish a task. For example, the control module 20 may be in direct communication with the power source, transmission and/or brakes of machine 16, and the control module 20 may provide commands to such machine components to assist in controlling machine propulsion and machine retarding.

Operator interface module 22 may be located onboard hauling machine 16 for manual recording of data. The data received via interface module 22 may include observed information associated with worksite 10, machine 16, and/or the operator. For example, the observed data may include a defect in the road over which hauling machine 16 is passing, an amount of observed precipitation or visibility at worksite 10, an excessive vibration, sound, or smell of hauling machine 16, or an identity and start time of the operator. The operator may record this information into a physical or electronic log book (not shown) located within hauling machine 16 during or after a work shift. In some cases, data from operator interface module 22 may automatically be combined with data captured by control module 20. For example, operator input regarding a transmission gear that is used at various locations along the haul route 40 may be coordinated with, for example, a geographical location of hauling machine 16, a machine travel speed, power source speed, lock-up clutch status, tire temperature, rim power, current transmission gear, machine payload, a grade of the haul route 40, a rolling resistance of the machine on the haul route 40, a brake coolant temperature, and/or the name of the operator driving hauling machine 16. Such data may be stored in a memory of the control module 20 and/or may be transmitted to the central station 18 for storage and/or analysis.

Communication module 24 may include any device that facilitates communication of data between hauling machine 16 and central station 18. Communication module 24 may include hardware and/or software that enables sending and/or receiving data through a wireless communication link 24a. It is contemplated that, in some situations, the data may be transferred to central station 18 through a direct data link (not shown), or downloaded from hauling machine 16 and uploaded to central station 18, if desired. It is also contemplated that, in some situations, the data automatically monitored by control module 20 may be electronically transmitted, while the operator-observed data may be communicated to central station 18 by a voice communication device, such as a two-way radio (not shown).

Communication module 24 may also have the ability to record the monitored and/or manually input data. For example, communication module 24 may include a data recorder (not shown) having a recording medium (not shown). In some cases, the recording medium may be portable, and data may be transferred from hauling machine 16 to central station 18 using the portable recording medium.

Figure 3:
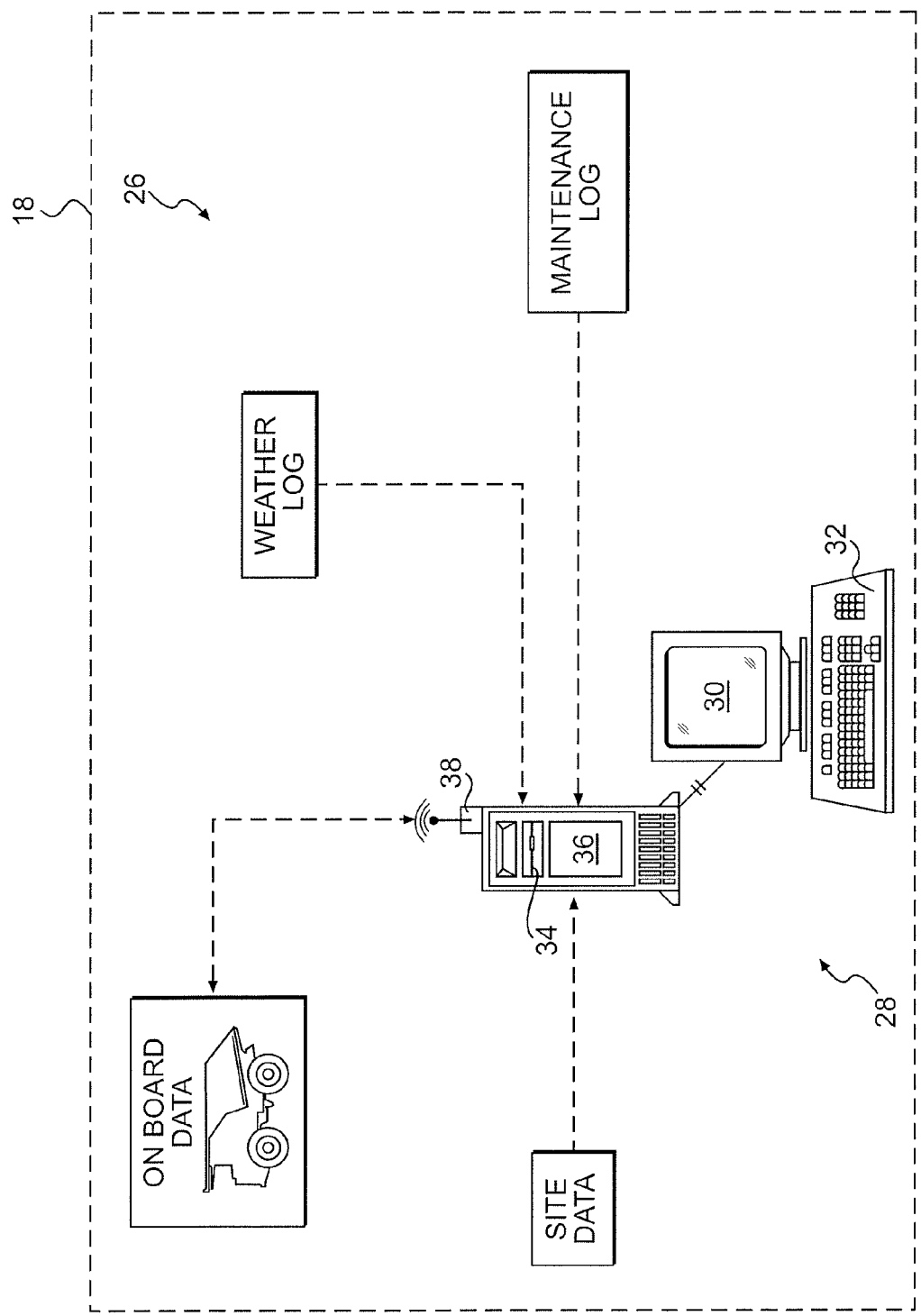
FIG. 3 is a schematic illustration of an exemplary disclosed worksite management system that may be used at the worksite of FIG. 1.

FIG. 3 is a schematic illustration of a worksite management system 26 configured to receive and analyze the data communicated to central station 18 from machines 12-16 and from other sources. Worksite management system 26 may include an offboard controller 28 in remote communication with machines 12-16 via central station 18 and configured to process data from a variety of sources and execute management methods at worksite 10. In exemplary embodiments, the controller 28 may be configured to predict and/or otherwise determine whether machine propulsion or machine retarding will be required for the machine to traverse, for example, the haul route 40 and/or other locations at the worksite 10. The controller 28 may make such determinations based on, for example, any of the data described above sent to and/or stored in central station 18. For example, such determinations may be based on the machine identification data, the machine performance data, and/or the diagnostic data described above. Such data may be associated with, for example, machine operation. Such determinations may also be based on the worksite data described above and/or any other data associated with worksite conditions. It is also understood that such determinations may be made by the controller 28 independently, the control module 20 independently, and/or through combined operation of the controller 28 and the control module 20.

In response to determining that machine propulsion will be required for greater than a machine propulsion threshold, the controller 28 may predict and/or otherwise determine a desired propulsion gear configured to maximize machine operating efficiency. As will be described in greater detail below, such a machine propulsion threshold may be a predetermined distance value or a predetermined period of time value. In additional exemplary embodiments, such a threshold may be a throttle value, power source speed value, and/or other machine value indicative or associated with machine propulsion. In such additional exemplary embodiments, controller 28 may determine that machine propulsion will be required by determining that a current corresponding machine value is greater than or less than the machine propulsion threshold. For example, operating the machine 12-16 in the desired propulsion gear along the upcoming portion of the haul route 40 may result in an increased transmission output speed ("TOS"), an increased machine travel speed, and a decreased power source output speed (PSOS). As a result, operating the machine 12-16 in the desired propulsion gear along the upcoming portion of the haul route 40 may result in improved power source efficiency as measured by, for example, tons hauled per gallon of fuel used, work performed per gallon of fuel used, and/or other known power source efficiency metrics. In exemplary embodiments, the PSOS may be determined at more than one location on the machine 12-16. For example, the PSOS may be sensed, measured, calculated, and/or otherwise determined at a transmission, torque converter, axle, crankshaft, countershaft, wheel, track, and/or other component connected to, driven by, and/or otherwise associated with the power source. Accordingly, as used herein, the PSOS may include and/or may determined based on one or more of TOS, transmission input speed, torque converter output speed, axle speed, crankshaft speed, countershaft speed, wheel speed, track speed, and/or other speeds associated with an output of the power source used by machine 12-16.

In response to determining that machine retarding will be required for greater than a machine retarding threshold, the controller 28 may predict and/or otherwise determine a desired retarding gear configured to maximize machine operating efficiency. As will be described in greater detail below, such a machine retarding threshold may be a predetermined distance value or a predetermined period of time value. In additional exemplary embodiments, such a threshold may be a throttle value, power source speed value, brake temperature value, brake fluid temperature value, and/or other machine value indicative or associated with machine retarding. In such additional exemplary embodiments, controller 28 may determine that machine retarding will be required by determining that a current corresponding machine value is greater than or less than the machine retarding threshold. For example, operating the machine 12-16 in the desired retarding gear along the upcoming portion of the haul route 40 may maximize machine travel speed along the haul route 40 while maintaining the temperature of the brake coolant below a maximum brake coolant temperature. Such a maximum brake coolant temperature may be associated with a boiling point and/or other characteristic of the brake coolant used in the brake coolant circuit. In exemplary embodiments, such a maximum brake coolant temperature may be between approximately 80 degrees Celsius and approximately 150 Celsius. In further exemplary embodiments, such a maximum brake coolant temperature may be between approximately 120 degrees Celsius and approximately 130 Celsius. It is understood that the temperature ranges described herein are merely exemplary, and that in additional exemplary embodiments, other temperature ranges may be employed. Such exemplary temperature ranges may depend upon, for example, the type of brake coolant and/or other fluids used, as well as other operating characteristics of the machine 12-16. Accordingly, the desired retarding gear may be determined based on the maximum brake coolant temperature. Operating the machine 12-16 in the desired retarding gear along the upcoming portion of the haul route 40, and thereby maintaining the brake coolant at a temperature below the maximum brake coolant temperatures described herein, may improve power source and/or machine efficiency. Such exemplary control methods will be described in greater detail below with respect to FIG. 4.

Controller 28 may include any type of computer or a plurality of computers networked together. Controller 28 may be located proximate the mining operation of worksite 10 or may be located at a considerable distance remote from the mining operation, such as in a different city or even a different country. It is also contemplated that computers at different locations may be networked together to form controller 28, if desired.

Controller 28 may include among other things, a console 30, an input device 32, an input/output device 34, a storage media 36, and a communication interface 38. Console 30 may be any appropriate type of computer display device that provides a graphics user interface (GUI) to display results and information to operators and other users of worksite management system 26. Input device 32 may be provided for operators to input information into controller 28. Input device 32 may include, for example, a keyboard, a mouse, or another computer input device. The input/output device 34 may be any type of device configured to read/write information from/to a portable recording medium. Input/output device 34 may include among other things, a floppy disk, a CD, a DVD, or a flash memory read/write device. Input/output device 34 may be provided to transfer data into and out of controller 28 using a portable recording medium. Storage media 36 could include any means to store data within controller 28, such as a hard disk. Storage media 36 may be used to store a database containing among others, historical worksite, machine, and operator related data. Communication interface 38 may provide connections with central station 18, enabling controller 28 to be remotely accessed through computer networks, and means for data from remote sources to be transferred into and out of controller 28. Communication interface 38 may contain network connections, data link connections, and/or antennas configured to receive wireless data.

Data may be transferred to controller 28 electronically or manually. Electronic transfer of data includes the remote transfer of data using the wireless capabilities or the data link of communication interface 38. Data may also be electronically transferred into controller 28 through a portable recording medium using input/output device 34. Manually transferring data into controller 28 may include communicating data to a control system operator in some manner, who may then manually input the data into controller 28 by way of, for example, input device 32. The data transferred into controller 28 may include machine identification data, performance data, diagnostic data, and other data associated with a machine operation at the worksite 10. The other data may include for example, weather data (current, historic from a weather log, and forecast), machine maintenance and repair data (such as from a maintenance log associated with the machine), worksite data such as survey information or soil test information, rolling resistance, haul route grade, and other data known in the art associated with a worksite condition.

Controller 28 may generate an analysis of the data collected from the control modules of each machine at worksite 10 and present results of the analysis to a user of worksite management system 26 and/or to the operators of particular machines 12-16 thereof by way of communications interface 38. The results may include a productivity analysis, an economic analysis (e.g., efficiency, fuel economy, operational cost, etc.), an environmental analysis (e.g., exhaust emissions, haul route conditions, worksite conditions, etc.), or other analysis specific to each machine, each category of machines (i.e., for digging machines 12, for loading machines 14, or for hauling machines 16), each co-located machine, each operator associated with machines 12-16, and/or for worksite 10 as a whole. In one embodiment, the results may be indexed according to time, for example, according to a particular shift, a particular 24-hr period, or another suitable parameter (e.g., time period, liters of fuel, cost, etc.).

The results of the analysis could be in the form of detailed reports or they could be summarized as a visual representation such as, for example, with an interactive graph. The results may be used to show a historical performance, a current performance, and/or a predicted, estimated, and/or otherwise determined performance of machines 12-16 operating at worksite 10. Alternatively or additionally, the results could be used to predict a progression of operations at worksite 10 and to estimate a time before the productivity, efficiency, or other performance measure of a particular machine operator, group of machines, or worksite 10 exceeds or falls below a desired or expected limit. The analysis may also include one or more corrections to determined machine operation data and/or worksite condition data. For example, as will be described in greater detail below with respect to FIG. 4, the controller 28 may assist in estimating, predicting, and/or otherwise determining a brake coolant temperature based on data associated with at least one of machine operation and worksite condition. Such data may be associated with, for example, a grade of the haul route 40 on which the machine 12-16 is currently located, a grade of an upcoming portion of the haul route 40, a payload of the machine 12-16, and/or a rolling resistance of the machine on the haul route 40. Such data may be determined by, for example, the one or more sensors 20a, 20b, 20c. In exemplary embodiments, such an analysis may modify and/or otherwise correct the data associated with at least one of the upcoming grade, current grade, payload, and rolling resistance. Such corrections may be based on, for example, a difference between an estimated and/or otherwise determined brake coolant temperature and a current brake coolant temperature. For example, such corrections may be a function of the magnitude of such a difference if the difference is greater than a predetermined coolant temperature difference threshold. Such a difference threshold may be between, for example, approximately 10 degrees Celsius and approximately 15 degrees Celsius.

In exemplary embodiments, the controller 28 may be adapted to determine the propulsion and retarding gears described herein through the use of one or more operational relationships of the particular machines 12-16. The operational relationship may include, for example, the shift points included within a transmission map, engine valve and/or ignition timings included within an engine map, fuel settings included within a torque limit map, maximum or minimum speed limits included within a travel limit map, steering boundaries included within a steering map, pressure and/or priority settings included within a tool actuation map, or other similar settings, limits, and/or boundaries contained within other software maps, algorithms, and/or equations stored electronically within the memory of control module 20. In general, the operational relationships described above may affect how a particular machine 12-16 responds in different situations. For example, the shift points of a transmission map may control the engine speed, rim power, and/or wheel torques at which a transmission of a particular machine 12-16 shifts to a lower or higher gear combination. Similarly, the engine valve and/or ignition timings of an engine map may control under what conditions intake and/or exhaust valves open or close, at what point within an engine cycle the combustion gas is energized, and resulting engine cylinder pressures and emissions. These operational relationships of machine 16 may be stored within a memory of the controller 28, and may be updated, in a closed-loop manner, during the various control methods described herein. For example, such operational relationships may be maintained within the software maps, algorithms, and/or equations employed by the controller 28 and/or the control module 20, and may be updated based on an error analysis and/or other analysis performed by the controller 28.

In exemplary embodiments, the controller 28 may remotely provide one or more signals to the control module 20, and such signals may include a command, an instruction, and/or a recommendation regarding operation of the machine 12-16. For example, the controller 28 may send a propulsion signal to the machine 12-16 and/or the control module 20 in response to determining that machine propulsion will be required along an upcoming portion of the haul route 40. Such a propulsion signal may indicate the desired propulsion gear associated with the haul route 40 for maximizing machine efficiency. The control module 20 may receive this signal and may recommend the propulsion gear to the operator via the operator interface module 22. In additional exemplary embodiments, the controller 28 may send a retarding signal to the machine 12-16 in response to determining that machine retarding will be required along the upcoming portion of the haul route 40. Such a retarding signal may indicate the desired retarding gear associated with the haul route 40 for maximizing machine efficiency. The control module 20 may receive this signal and may recommend the retarding gear to the operator via the operator interface module 22. In exemplary embodiments, the signals sent by the controller 28 may further include operational commands, instructions, and/or recommendations regarding fueling, engine speed, transmission shifting, ground speed, acceleration, deceleration, steering, and other performance parameters.

Figure 4:
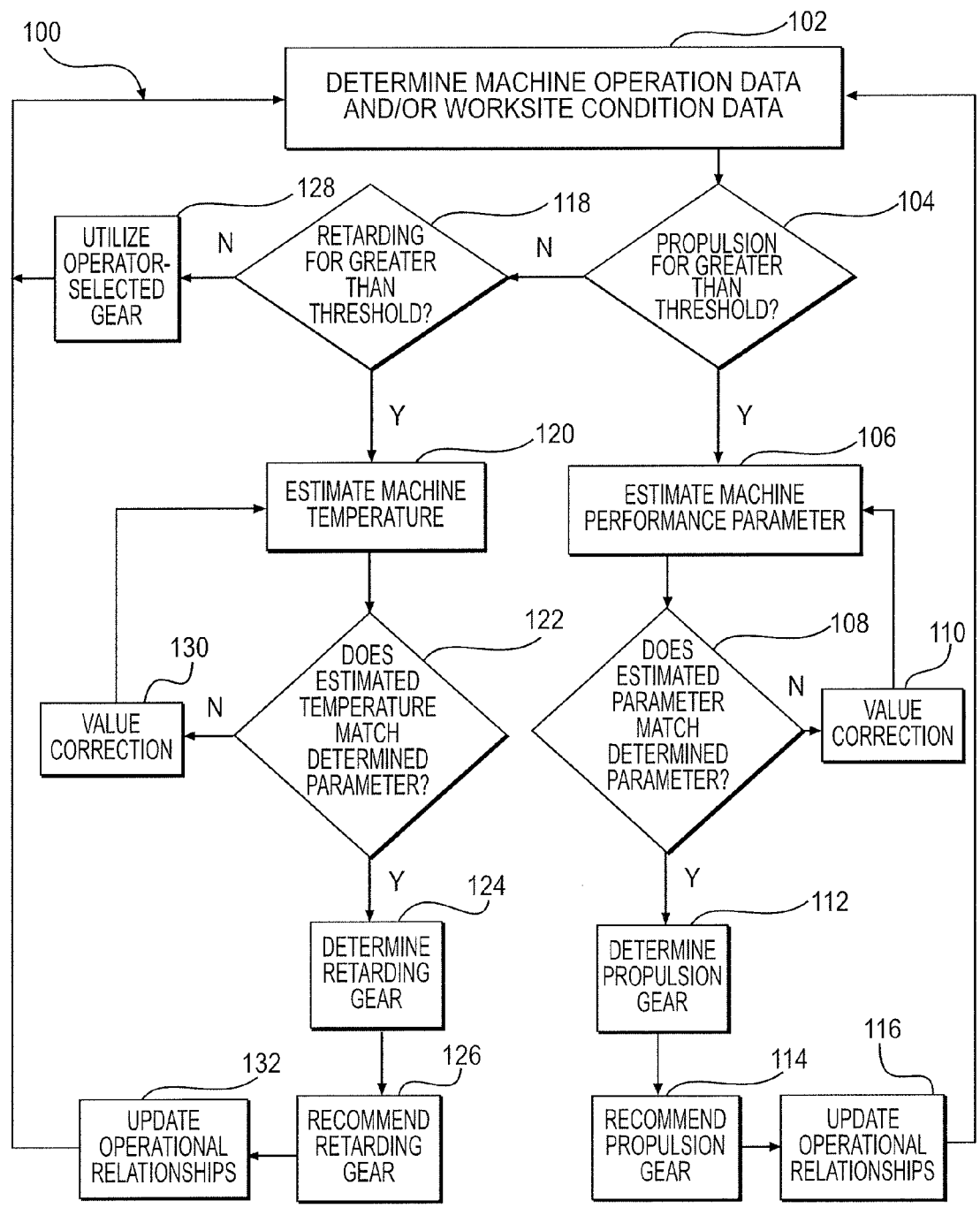
FIG. 4 is a flowchart depicting an exemplary disclosed method that may be performed by the worksite management system of FIG. 3.

FIG. 4 illustrates a flowchart 100 depicting an exemplary operation performed by controller 28. FIG. 4 will be discussed in more detail below to further illustrate worksite management system 26 and its operation.

INDUSTRIAL APPLICABILITY

The disclosed system may provide an efficient method for managing worksite performance. In particular, the disclosed system may manage performance at a worksite by analyzing data measured from onboard machines at the worksite and by providing recommendations for propulsion and/or retarding gears to the operators of worksite machines to assist in improving overall efficiency and productivity of the worksite 10.

During operation at worksite 10, data from various sources including digging, loading, and hauling machines 12-16, operators thereof, and other sources, may be collected by worksite management system 26 and analyzed. For example, the sensors 20a, 20b, 20c may assist in sensing, measuring, calculating, estimating, and/or otherwise determining the machine operation data, worksite condition data, and/or any of the other data described herein (Step: 102). It is understood that sensing, measuring, calculating, and/or estimating are exemplary methods of determining such data. Such data may additionally include local and/or global position data associated with each machine 12-16, and/or other machines 12-16 at the worksite 10. For instance, such data may include traffic congestion information indicative of the location of one or more such machines 12-16 on the haul route 40. Such data may be determined using one or more global positioning systems and/or other like means. Such data may further include stored data regarding the haul route 40 and/or previous machine operation (e.g., propulsion or retarding) along an upcoming portion of the haul route 40. Such stored data may be historical data corresponding to the particular machine being used, the particular operator, and/or to machines of similar type that previously traversed the haul route 40. Such data may be sent to the controller 28, and the controller 28 may determine, based on the data, whether machine propulsion or machine retarding will be required for greater than a corresponding threshold. For example, such a threshold may be one of a predetermined distance and a predetermined period of time. In such exemplary embodiments, a predetermined distance may be between approximately 1 mile and approximately 1.5 miles. Likewise, such a predetermined period of time may be between approximately one minute and approximately two minutes. In additional exemplary embodiments, other corresponding thresholds may be chosen, and the predetermined distances and/or periods of time described herein are merely exemplary. For example, in additional embodiments, the predetermined distances and/or predetermined periods of time may be significantly greater than or significantly less than those described above. For example, a predetermined distance may be greater than or equal to approximately 4 miles, and a predetermined period of time may be greater than or equal to approximately 5 minutes. Additionally, it is understood that in further embodiments, the control module 20 may be utilized to perform one or more of the steps illustrated in flowchart 100 instead of or in conjunction with the controller 28. For ease of description, however, performance of the controller 28 shall be described for the duration of this disclosure unless otherwise specified.

At Step: 104, the controller 28 may determine that machine propulsion will be required by predicting, estimating, and/or otherwise determining that a TOS will be greater than a transmission upshift speed setpoint for greater than either a predetermined distance or a predetermined period of time. Alternatively, at Step: 104, the controller 28 may determine that machine propulsion will be required by determining that a throttle pedal position will be greater than a throttle pedal position threshold for greater than either a predetermined distance or a predetermined period of time. In still further exemplary embodiments, at Step: 104, the controller 28 may determine that machine propulsion will be required by determining that a TOS will be less than a transmission downshift speed for greater than either a predetermined distance or a predetermined period of time. One or more maps, look-up tables, algorithms, and/or other like means stored in a memory of the controller 28 may be used to make such a determination using any of the data described herein as inputs. As described above, worksite maps, conditions, and/or stored historical data may also be used to guide such determinations. If the controller 28 determines that propulsion will be required for greater than the corresponding threshold (Step: 104—Yes), the controller 28 may predict, estimate, and/or otherwise determine one or more machine performance parameters (Step: 106). For example, at Step: 106 the controller 28 may enter data associated with throttle pedal position, TOS, PSOS, rolling resistance, payload, machine travel speed, current haul route grade, rim power, transmission gear, lock-up clutch status, and/or other parameters into one or more propulsion algorithms to determine an estimated PSOS. In addition, the controller 28 may input such data into one or more maps, look-up tables, and/or plots to determine an estimated PSOS.

At Step: 108, the controller 28 may determine whether the machine performance parameter determined at Step: 106 matches and/or otherwise coincides with corresponding data determined at Step: 102. For example, in exemplary embodiments in which PSOS is estimated at Step: 106, at Step: 108 the controller 28 may determine a difference between the estimated PSOS and a current PSOS determined at Step: 102. It is understood that the use of PSOS at Steps: 106 and 108 is merely exemplary, and that any other machine performance parameters may be utilized by the controller 28 in place of and/or in addition to PSOS in order to determine a propulsion gear. At Step: 108, the controller 28 may determine whether the difference between the estimated PSOS and the current PSOS is less than a predetermined PSOS difference threshold. In exemplary embodiments, such a difference threshold may have a value between approximately 10 rpm and approximately 20 rpm. In still further exemplary embodiments such a difference threshold may have a value between approximately 5 rpm and approximately 25 rpm. In additional embodiments, such a difference threshold may have any value greater than or less than zero rpm (i.e., any difference between the estimated PSOS and a current PSOS determined at Step: 102 (Step: 108—No) may cause control to proceed to Step: 110 for data correction).

For example, if at Step: 108 the controller 28 determines that the machine performance parameter determined at Step: 106 does not match and/or otherwise coincide with corresponding data determined at Step: 102 (Step: 108—No), control may proceed to Step: 110 where the controller 28 may correct the data previously determined at Step: 102. For example, if the controller 28 determines at Step: 108 that the difference between the estimated PSOS and the current PSOS is greater than a PSOS difference threshold, the controller 28 may perform a value correction at Step: 110 wherein the data associated with one or more of the current haul route grade, current machine rim power, machine payload, machine rolling resistance on the haul route 40, and/or other data determined at Step: 102 may be adjusted.

As part of the value correction at Step: 110, for example, the controller 28 may generate one or more corrected data values that may be utilized in recalculating the machine performance parameter previously estimated at Step: 106. The value correction occurring at Step: 110 may comprise, for example, a recalibration of one or more of the sensors 20a, 20b, 20c described herein. For example, it is understood that the accuracy of strut pressures, weight measurements, and/or other values associated with a payload determined at Step: 102 may be dependent upon the condition, age, and/or calibration of corresponding machine sensors. The values associated with determining rim power, rolling resistance, current haul route grade, and/or other machine operating data at Step: 102 may also be dependent upon the condition, age, and/or calibration of corresponding machine sensors, as well as changing worksite conditions. For example, values associated with determining haul route grade may be dependent upon the calibration of one or more accelerometers, gyroscopes, and/or other like sensors used to determine haul route grade at Step: 102. Such values may also vary over time based on, for example, degradation and/or repair of haul route 40. Likewise, change in weather and resulting haul route conditions may impact the accuracy and/or variation in values associated with determining rolling resistance at Step: 102. Such sensors may be recalibrated at Step: 110, in a closed-loop manner, so as to improve the accuracy of future machine performance parameter estimations made at Step: 106. The value correction at Step: 110 may also comprise modifying one or more gains, coefficients, variables, and/or algorithmic terms used in determining the machine performance parameter at Step: 106. Such gains, coefficients, variables, and/or algorithmic terms may be associated with each of the respective values corrected at Step: 110.

Control may proceed from Step: 110 to Step: 106, in a closed-loop manner, where the corrected data generated at Step: 110 may be used by the controller 28 to determine an additional machine performance parameter. For example, upon returning to Step: 106, the controller 28 may calculate an additional estimated PSOS using one or more of the corrected grade, rim power, payload, and/or rolling resistance values generated at Step: 110. Control may then proceed to Step: 108 where the controller 28 may determine a difference between the additional estimated PSOS and a current PSOS determined at Step: 102. At Step: 108, the controller 28 may also determine whether the difference between the additional estimated PSOS and the current PSOS is less than a predetermined PSOS difference threshold. Control may repeat through Steps: 106, 108, and 110, in a closed-loop manner, until the controller 28 determines at Step: 108 that the estimated PSOS and/or other machine performance parameter coincides with and/or otherwise matches corresponding data determined at Step: 102 (Step: 108—Yes). For example, determining at Step: 108 that an additional estimated PSOS matches a corresponding PSOS determined at Step: 102 may include determining an additional estimated PSOS value that is closer to a current PSOS than the PSOS originally or previously estimated at Step: 106. In such embodiments, for example, a difference between the additional estimated PSOS determined based on the corrected data at Step: 106 and a current PSOS determined at Step: 102 may be less than the PSOS difference threshold described above.

Control may then proceed from Step: 108 to Step: 112 where the controller 28 may determine a desired propulsion gear. In exemplary embodiments, the data determined at Step: 102 may be used by the controller 28 in determining the propulsion gear at Step: 112. Additionally or alternatively, one or more of the corrected data generated at Step: 110 and/or an original or additional estimated PSOS determined at Step: 106 may be used in determining the propulsion gear. In additional exemplary embodiments, the additional estimated PSOS or other machine parameter estimated at Step: 106 may also be used at Step: 112 to determine the desired propulsion gear. For example, at Step: 112 the controller 28 may enter data associated with lock-up clutch status, current transmission gear, rim power, haul route grade, rolling resistance, payload, machine travel speed, TOS, PSOS, throttle pedal position, and/or other machine parameters into one or more propulsion algorithms to determine the desired propulsion gear. In addition, the controller 28 may input such data into one or more maps, look-up tables, and/or plots to determine the desired propulsion gear at Step: 112. For example, one or more rim power versus machine travel speed plots may be stored in a memory of the controller 28. Such a plot may illustrate power curves associated with each of the various gears of the machine transmission. Such a plot may also illustrate the optimal transmission upshift speeds associated with each gear, and such upshift speeds may be represented relative to each respective power curve. For example, such a plot may indicate, for each transmission gear, the optimal machine travel speed at which the transmission may be shifted to a higher gear. The controller 28 may reference one or more such plots in determining the desired propulsion gear at Step: 112.

In exemplary embodiments, the controller 28 may also reference stored historical data indicative of transmission gears previously utilized by the same or similar machines along the upcoming portion of the haul route 40 in determining the propulsion gear at Step: 112. For example, the controller 28 may reference such stored data to confirm that the desired propulsion gear determined at Step: 112 based on the rim power versus machine travel speed plot is accurate. If, for example, the propulsion gear determination made using the rim power versus machine travel speed plot does not match propulsion gear identified in the stored historical data, the controller 28 may override one of the rim power versus machine travel speed plot data and the stored historical data in favor of the other. It is understood that such stored historical data may be based on GPS information, associated with various locations along the haul route 40 and/or within worksite 10.

The propulsion gear determined at Step: 112 may be a transmission gear enabling improved machine performance along an upcoming portion of the haul route 40. For example, an operator may be accustomed to traversing an uphill haul route 40 in fourth gear. The operator may know through experience that, for example, that the machine is capable of traversing slopes having an uphill grade similar to that of the haul route 40 in fourth gear without the transmission of the machine automatically hunting between alternate gears. Moreover, the operator may be trained to avoid selecting higher gears in such situations in order to avoid such transmission gear hunting. It is known that such gear hunting can result in material spillage, reduced productivity, and ultimately, early transmission failure. As a result, in such situations, the operator may avoid selecting gears higher than fourth gear while traversing the uphill haul route 40 and, instead, may gear limit the transmission to fourth gear.

The exemplary methods of the present disclosure may, however, be configured to recommend, for example, upshifting the transmission in propulsion situations in which the transmission and the power source are capable of maintaining a higher gear without harmful gear hunting by the transmission. Upshifting in such situations may, for example, increase TOS and machine travel speed along an uphill haul route 40 while, at the same time, decreasing PSOS. Accordingly, upshifting in such situations may improve engine efficiency. In exemplary embodiments, at Step: 112 the controller 28 may determine that the desired propulsion gear will yield a higher machine travel speed and/or a lower PSOS than a current gear of the transmission, and the propulsion gear determined at Step: 112 may be recommended to the operator (as will be described below with respect to Step: 114) in response to one or more such determinations. It is understood that, in exemplary embodiments, the power source may burn more fuel by operating in such higher gears while increasing the amount of work performed by the power source per gallon of fuel used.

Once the desired propulsion gear is determined at Step: 112, control may proceed to Step 114 where the controller 28 may recommend the propulsion gear to the operator of the machine. In exemplary embodiments, the controller 28 may recommend the propulsion gear to the operator by providing a signal indicative of the desired propulsion gear to the onboard control module 20 via the communication interface 38. For example, such a signal may be received by the communication module 24, and may be conveyed to the operator via the operator interface module 22. In exemplary embodiments, the operator interface module 22 may comprise one or more digital displays, screens, monitors, and/or other like devices configured to visually display the recommended propulsion gear for viewing by the operator. In addition and/or in place of such a visual display, the operator interface module 22 may comprise one or more speakers or other like components configured to transmit audible commands and/or recommendations based on signals received from the controller

28. In such exemplary embodiments, the operator interface module 22 may provide the recommended propulsion gear to the operator audibly. In still further exemplary embodiments in which the machine is controlled autonomously (i.e., in embodiments in which the machine is unmanned and/or controlled remotely), controller 28 may provide a signal indicative of the desired gear to the onboard control module 20. In such embodiments, onboard control module 20 and/or additional components of the machine in communication with onboard control module 20 may actively change the current gear to the recommended gear in response to the signal.

Control may then proceed to Step: 116 where the controller 28 may update one or more of the operational relationships associated with the machine. Such operational relationships may include, for example, the optimal transmission upshift speeds, power curves, and/or other information illustrated in the various rim power versus machine travel speed plots stored in the memory of the controller 28. In addition, as described above, such operational relationships may include engine valve and/or ignition timings included within an engine map, fuel settings included within a torque limit map, maximum or minimum speed limits included within a travel limit map, steering boundaries included within a steering map, pressure and/or priority settings included within a tool actuation map, or other similar settings, limits, and/or boundaries contained within other software maps, algorithms, and/or equations stored electronically within the memory of control module 20 and/or the controller 28. Such operational relationships may be updated based on an error analysis and/or other analysis performed by the controller 28 at Step: 116. For example, the controller 28 may employ one or more neural networks configured to "learn" such operational relationships through multiple iterations and/or closed-loop propulsion gear determinations. It is understood that such operational relationships may also include any of the stored historical data described herein. Any of the operational relationships updated at Step: 116 may be employed by the controller 28 in future propulsion gear determinations. From Step: 116, control may proceed to Step: 102 in a closed-loop manner.

With continued reference to Step: 104, if the controller 28 determines that propulsion will not be required for greater than the corresponding threshold (Step: 104—No), control may proceed to Step: 118 where the controller 28 may determine whether retarding will be required for greater than a corresponding threshold. For example, at Step: 118, the controller 28 may determine that machine retarding will be required by predicting, estimating, and/or otherwise determining that a grade of the haul route 40 will be below a predetermined grade threshold for greater than either a predetermined distance or a predetermined period of time. One or more maps, look-up tables, algorithms, and/or other like means stored in a memory of the controller 28 may be used to make such a determination using any of the data described herein as inputs. As described above, worksite maps, conditions, and/or stored historical data may be used to guide such haul route grade determination. Additionally, as described above, in such exemplary embodiments, a predetermined distance may be between approximately 1 mile and approximately 1.5 miles. Likewise, such a predetermined period of time may be between approximately 1 minute and approximately 2 minutes. As noted above, in additional exemplary embodiments, other corresponding thresholds may be chosen, and such other corresponding thresholds may be significantly greater than or significantly less than approximately 1-1.5 miles and approximately 1-2 minutes.

If the controller 28 determines that machine retarding will be required for greater than the corresponding threshold (Step: 118—Yes), the controller 28 may predict, estimate, and/or otherwise determine one or more machine temperatures (Step: 120). For example, at Step: 120 the controller 28 may enter data associated with PSOS, machine travel speed, current haul route grade, upcoming haul route grade, machine payload, rolling resistance, current brake coolant temperature, tire temperature, and/or other parameters into one or more temperature algorithms to determine an estimated brake coolant temperature. In addition, the controller 28 may input such data into one or more maps, look-up tables, and/or plots to determine an estimated brake coolant temperature. Although brake coolant temperature is described herein as an exemplary machine temperature estimated at Step: 120, in additional exemplary embodiments, one or more different machine temperatures may also be estimated and/or otherwise determined at Step: 120 and used in the determination of a retarding gear. Such temperatures include, for example, brake temperature, power source temperature, transmission temperature, lubrication fluid temperature, tire temperature, exhaust temperature, and/or other known temperatures associated with the machines described herein in and their components.

Once such an exemplary machine temperature is determined at Step: 120, control may proceed to Step: 122 where the controller 28 may determine whether the temperature determined at Step: 120 matches and/or otherwise coincides with corresponding temperature data determined at Step: 102. For example, in exemplary embodiments in which brake coolant temperature is estimated at Step: 120, at Step: 122 the controller 28 may determine a difference between the estimated brake coolant temperature and a current brake coolant temperature determined at Step: 102. At Step: 122, the controller 28 may then determine whether the difference between the estimated brake coolant temperature and the current brake coolant temperature is less than a predetermined coolant temperature difference threshold. In exemplary embodiments, such a difference threshold may have a value less than approximately 10 degrees Celsius and in further exemplary embodiments, such a difference threshold may have a value less than approximately 5 degrees Celsius. In additional embodiments, such a difference threshold may have any value greater than or less than zero degrees Celsius (i.e., any difference between the estimated brake coolant temperature and a current brake coolant temperature determined at Step: 102 (Step: 122—No) may cause control to proceed to Step: 130 for data correction).

For example, if at Step: 122 the controller 28 determines that the machine temperature determined at Step: 120 does not match and/or otherwise coincide with corresponding temperature data determined at Step: 102 (Step: 122—No), control may proceed to Step: 130 where the controller 28 may correct the data previously determined at Step: 102. For example, if the controller 28 determines at Step: 122 that the difference between the estimated brake coolant temperature and the current brake coolant temperature is greater than a coolant temperature difference threshold, the controller 28 may perform a value correction at Step: 130 wherein the data associated with one or more of the current haul route grade, machine payload, rolling resistance, and/or other data determined at Step: 102 may be adjusted.

As part of the value correction at Step: 130, for example, the controller 28 may generate one or more corrected data values that may be utilized in recalculating the machine temperature previously estimated at Step: 120. The value correction occurring at Step: 130 may comprise, for example, a recalibration of one or more of the sensors 20a, 20b, 20c described herein, and/or any of the additional processes described above with respect to Step: 110. For example, the value correction at Step: 130 may also comprise modifying one or more gains, coefficients, variables, and/or algorithmic terms used in determining the machine temperature at Step: 120. Such gains, coefficients, variables, and/or algorithmic terms may be associated with each of the respective values corrected at Step: 130.

From Step: 130, control may proceed to Step: 120, in a closed-loop manner, where the corrected data generated at Step: 130 may be used by the controller 28 to determine an additional machine temperature. For example, upon returning to Step: 120, the controller 28 may calculate an additional estimated brake coolant temperature using one or more of the corrected grade, rim power, payload, and rolling resistance values generated at Step: 130. Control may then proceed to Step: 122 where the controller 28 may determine a difference between the additional estimated brake coolant temperature and a current brake coolant temperature determined at Step: 102. At Step: 122, the controller 28 may also determine whether the difference between the additional estimated brake coolant temperature and the current brake coolant temperature is less than the predetermined coolant temperature difference threshold described above. Control may repeat through Steps: 120, 122, and 130, in a closed-loop manner, until the controller 28 determines at Step: 122 that the estimated brake coolant temperature and/or other machine temperature coincides with and/or otherwise matches corresponding temperature data determined at Step: 102 (Step: 122—Yes). For example, determining at Step: 122 that an additional estimated brake coolant temperature matches a corresponding current brake coolant temperature determined at Step: 102 may include determining an additional estimated brake coolant temperature value that is closer to a current brake temperature than the brake coolant temperature originally or previously estimated at Step: 120. In such embodiments, for example, a difference between the additional estimated brake coolant temperature determined based on the corrected data at Step: 120 and a current brake coolant temperature determined at Step: 102 may be less than the coolant temperature difference threshold described above.

Control may then proceed from Step: 122 to Step: 124 where the controller 28 may determine a desired retarding gear. In exemplary embodiments, the data determined at Step: 102 may be used by the controller 28 in determining the retarding gear at Step: 124. Additionally or alternatively, one or more of the corrected data generated at Step: 130 may be used in determining the retarding gear. For example, at Step: 124 the controller 28 may enter data associated with PSOS, transmission gear, machine travel speed, current haul route grade, upcoming haul route grade, machine payload, rolling resistance, current brake coolant temperature, tire temperature, the original and/or additional machine temperature estimated at Step: 120, and/or other parameters into one or more retarding algorithms to determine the desired retarding gear. In addition, the controller 28 may input such data into one or more maps, look-up tables, and/or plots to determine the desired retarding gear at Step: 124.

In exemplary embodiments, the controller 28 may also reference stored historical data indicative of transmission gears previously utilized by the same or similar machines along an upcoming portion of the haul route 40 in determining the retarding gear at Step: 124. For example, the controller 28 may reference such stored data to confirm that the desired retarding gear determined at Step: 124 matches previous determinations made along the same haul route 40 and/or along the same portions of the haul route 40. If, for example, the retarding gear determination made at Step: 124 does not match the retarding gear identified in the stored historical data, the controller 28 may override one of the retarding gear determinations in favor of the other. It is understood that such stored historical data may be based on GPS information associated with various locations along the haul route 40 and/or within worksite 10.

It is also understood that the retarding gear may be determined at Step: 124 based on a predetermined temperature threshold associated with the machine. More particularly, the retarding gear may be determined at Step: 124 based on a maximum allowable brake coolant temperature. As described above, such a maximum brake coolant temperature may be associated with a boiling point and/or other characteristic of the brake coolant used in a brake coolant circuit of the machine. In exemplary embodiments, such a maximum brake coolant temperature may be between approximately 80 degrees Celsius and approximately 150 degrees Celsius. In further exemplary embodiments, such a maximum brake coolant temperature may be between approximately 120 degrees Celsius and approximately 130 Celsius. Accordingly, the desired retarding gear may be determined at Step: 124 in order to maintain the temperature of machine brake coolant below this maximum brake coolant temperature.

In exemplary embodiments in which the machine is directed to travel along a haul route 40 having a declined grade, operating the machine in the retarding gear determined at Step: 124 along the declined grade haul route 40 may improve power source and/or machine efficiency. For example, the methods described herein may utilize known power source braking methods to assist in machine retarding for a portion of the haul route 40, and may recommend upshifting to the retarding gear determined at Step: 124 for a remainder of the haul route 40. By upshifting to the retarding gear determined at Step: 124, the operator may affect an increase in machine travel speed for the remainder of the haul route 40 while maintaining the brake coolant temperature below the maximum brake coolant temperature. Such control methods may result in an overall increase in power source efficiency and may reduce travel time along the haul route 40 in machine retarding situations. Further, it is understood that such a retarding gear sequence and/or combination may be determined at Step: 124 as a strategy for optimizing machine performance along the declined grade haul route 40 while maintaining the brake coolant temperature below the maximum brake coolant temperature. For example, at Step: 124, the controller 28 may be configured to determine a sequence of more than one retarding gears to be utilized on the haul route 40. At Step: 124, the controller 28 may also determine a time and/or location at which the various retarding gears should be engaged as the machine traverses the haul route. Such a retarding gear sequence may assist in maximizing machine efficiency and reducing travel time along the haul route in machine retarding situations, and may be tailored to maintain brake coolant temperatures below the maximum brake coolant temperature for the duration of the haul route.

Once the desired retarding gear and/or retarding gear sequence is determined at Step: 124, control may proceed to Step 126 where the controller 28 may recommend the retarding gear and/or gears to the operator of the machine. In exemplary embodiments, the controller 28 may recommend the retarding gear to the operator by providing a signal indicative of the desired retarding gear to the onboard control module 20 via the communication interface 38. For example, such a signal may be received by the communication module 24, and may be conveyed to the operator via the operator interface module 22 as described above with respect to Step: 114. In still further exemplary embodiments in which the machine is controlled autonomously (i.e., in embodiments in which the machine is unmanned and/or controlled remotely), controller 28 may provide a signal indicative of the desired gear to the onboard control module 20. In such embodiments, onboard control module 20 and/or additional components of the machine in communication with onboard control module 20 may actively change the current gear to the recommended gear in response to the signal.

Control may then proceed to Step: 132 where the controller 28 may update one or more of the operational relationships associated with the machine. As described above, such operational relationships may include engine valve and/or ignition timings included within an engine map, fuel settings included within a torque limit map, maximum or minimum speed limits included within a travel limit map, steering boundaries included within a steering map, pressure and/or priority settings included within a tool actuation map, or other similar settings, limits, and/or boundaries contained within other software maps, algorithms, and/or equations stored electronically within the memory of control module 20 and/or the controller 28. Such operational relationships may be updated based on an error analysis and/or other analysis performed by the controller 28 at Step: 132. For example, the controller 28 may employ one or more neural networks configured to "learn" such operational relationships through multiple iterations and/or closed-loop retarding gear determinations. It is understood that such operational relationships may also include any of the stored historical data described herein. Any of the operational relationships updated at Step: 132 may be employed by the controller 28 in future retarding gear determinations. From Step: 132, control may proceed to Step: 102 in a closed-loop manner.

With continued reference to Step: 118, if the controller 28 determines that retarding will not be required for greater than the corresponding threshold (Step: 118—No), control may proceed to Step: 128 where the controller 28 may utilize and/or continue utilizing a transmission gear selected by the operator. Control may proceed from Step: 128 to Step: 102 in a closed-loop manner.

It will be apparent to those skilled in the art that various modifications and variations can be made in the disclosed worksite management system without departing from the scope of this disclosure. Other embodiments will be apparent to those skilled in the art from consideration of the specification and practice of the worksite management system. It is intended that the specification and examples be considered as exemplary only, with a true scope being indicated by the following claims.

What is claimed is:

1. A method of operating a machine at a worksite, comprising:
   determining data associated with at least one of a machine operation at the worksite and a worksite condition;
   determining, based on the data, that one of machine propulsion and machine retarding will be required for greater than a corresponding threshold;
   determining, in response to determining that machine propulsion will be required, a desired propulsion gear, and recommending the propulsion gear to an operator of the machine; and
   determining, in response to determining that machine retarding will be required, a desired retarding gear, and recommending the retarding gear to the operator,
   wherein the retarding gear is determined based on a maximum temperature associated with the machine.

2. The method of claim 1, further including estimating a brake coolant temperature based on data associated with at least one of an upcoming grade of a haul route of the worksite on which the machine is located, a current grade of the haul route, a payload of the machine, and a rolling resistance of the machine on the haul route.

3. The method claim 2, further including determining the retarding gear based on a difference between the estimated brake coolant temperature and a current brake coolant temperature.

4. The method of claim 3, further including determining the retarding gear in response to determining that the difference is less than a coolant temperature difference threshold.

5. The method of claim 3, further including operating the machine in the retarding gear, wherein operating the machine in the retarding gear maintains brake coolant of the machine at a temperature below the maximum temperature associated with the machine.

6. The method of claim 3, further including determining that the difference is greater than a coolant temperature difference threshold,
   correcting the data associated with the at least one of the upcoming grade, the current grade, the payload, and the rolling resistance based on the difference, and
   determining the desired retarding gear based on the corrected data.

7. The method of claim 6, wherein correcting the data includes generating the corrected data based on the difference, and
   determining the desired retarding gear based on the corrected data comprises determining a temperature value closer to the current brake coolant temperature than the estimated brake coolant temperature.

8. The method of claim 1, further including recommending the retarding gear for a first portion of the haul route, and recommending an additional retarding gear for a second portion of the haul route, wherein the additional retarding gear is determined based on stored data associated with the haul route.

9. The method of claim 1, further including determining, for a haul route of the worksite on which the machine is located, that the desired propulsion gear will yield a higher machine travel speed and a lower machine power source speed than a current transmission gear, and
   recommending the desired propulsion gear to the operator in response to determining that the desired propulsion gear will yield the higher machine travel speed and the lower machine power source speed.

10. The method of claim 1, further including estimating a power source speed based on data associated with at least one of a current grade of a haul route of the worksite on which the machine is located, a rim power of the machine, a payload of the machine, and a rolling resistance of the machine on the haul route, and
    determining the propulsion gear based on a difference between the estimated power source speed and a current power source speed.

11. The method of claim 10, further including determining that the difference is greater than a power source speed difference threshold,
    correcting the data associated with at least one of the current grade, the rim power, the payload, and the rolling resistance based on the difference, and
    determining the propulsion gear based on the corrected data,
    wherein determining the propulsion gear based on the corrected data comprises determining a power source speed value closer to the current power source speed than the estimated power source speed.

12. The method of claim 1, wherein the corresponding threshold comprises at least one of a predetermined distance and a predetermined period of time, and
determining that machine propulsion will be required includes determining that
a) a throttle pedal position will be greater than a throttle pedal position threshold for greater than the at least one of the predetermined distance and the predetermined period of time, or that
b) a transmission output speed will be greater than a transmission upshift speed for greater than the at least one of the predetermined distance and the predetermined period of time, or that
c) a transmission output speed will be less than a transmission downshift speed for greater than the at least one of the predetermined distance and the predetermined period of time.

13. The method of claim 1, wherein the corresponding threshold comprises at least one of a predetermined distance and a predetermined period of time, and
determining that machine retarding will be required includes determining that a grade of a haul route of the worksite on which the machine is located will be below a grade threshold for greater than the at least one of the predetermined distance and the predetermined period of time.

14. A method of operating a machine at a worksite, comprising:
determining data associated with a machine operation at the worksite and a worksite condition;
providing the data to a remote worksite controller in communication with the machine;
determining, based on the data, that one of machine propulsion and machine retarding will be required for greater than a corresponding threshold;
sending, in response to determining that machine propulsion will be required, a propulsion signal from the worksite controller to the machine,
the propulsion signal indicating a desired propulsion gear associated with a haul route of the worksite on which the machine is located, and
recommending the propulsion gear to an operator of the machine in response to the propulsion signal; and
sending, in response to determining that machine retarding will be required, a retarding signal from the worksite controller to the machine,
the retarding signal indicating a desired retarding gear associated with the haul route, and
recommending the retarding gear to the operator in response to the retarding signal, wherein the retarding gear is determined based on a maximum brake coolant temperature associated with the machine.

15. The method of claim 14, wherein the worksite controller is in communication with a plurality of machines operating at the worksite,
the machine comprises one of the plurality of machines, and
the worksite condition comprises a traffic congestion associated with the plurality of machines and the haul route.

16. The method of claim 14, wherein the worksite controller determines that one of machine propulsion and machine retarding will be required based on stored data associated with the haul route.

17. The method of claim 14, further including
estimating a power source speed based on data associated with at least one of a current grade of the haul route, a rim power of the machine, a payload of the machine, and a rolling resistance of the machine on the haul route,
determining that a difference between the estimated power source speed and a current power source speed is greater than a power source speed difference threshold,
correcting the data associated with the at least one of the current grade, the rim power, the payload, and the rolling resistance based on the difference, and
determining an additional estimated power source speed based on the corrected data,
wherein a difference between the additional estimated power source speed and the current power source speed is less than the power source speed difference threshold.

18. The method of claim 14, further including
estimating a brake coolant temperature based on data associated with at least one of an upcoming grade of the haul route, a current grade of the haul route, a payload of the machine, and a rolling resistance of the machine on the haul route,
determining that a difference between the estimated brake coolant temperature and a current brake coolant temperature is greater than a coolant temperature difference threshold,
correcting the data associated with the at least one of the upcoming grade, the current grade, the payload, and the rolling resistance based on the difference, and
determining an additional estimated brake coolant temperature based on the corrected data,
wherein a difference between the additional estimated brake coolant temperature and the current brake coolant temperature is less than the coolant temperature threshold.

19. A system for use with a machine at a worksite, comprising:
at least one sensor disposed on the machine, the at least one sensor configured to determine data associated with at least one of a machine operation at the worksite and a worksite condition;
a control module disposed on the machine, wherein the control module is in communication with the at least one sensor and is configured to control operations of the machine; and
a worksite controller disposed remote from the machine and in communication with the control module, the worksite controller configured to
determine, based on the data, that one of machine propulsion and machine retarding will be required for greater than a corresponding threshold;
send, in response to determining that machine propulsion will be required, a propulsion signal to the control module, the propulsion signal indicating a desired propulsion gear associated with a haul route of the worksite on which the machine is located, wherein the control module is configured to recommend the propulsion gear to an operator of the machine in response to the propulsion signal; and
send, in response to determining that machine retarding will be required, a retarding signal to the control module, the retarding signal indicating a desired retarding gear associated with the haul route, wherein the control module is configured to recommend the retarding gear to the operator in response to the retarding signal, and wherein the retarding gear is determined based on a maximum temperature associated with the machine.

20. The system of claim 19, further including an operator interface module disposed on the machine and in communication with the control module, the control module configured to recommend the retarding gear and the propulsion gear to the operator via the operator interface module.

* * * * *